United States Patent [19]

Fong

[11] 3,734,567
[45] May 22, 1973

[54] AIR CONVEYOR FOR FLAT THIN ARTICLES

[75] Inventor: Leong Quock Fong, San Jose, Calif.

[73] Assignee: Bangor Punta Operations, Inc., Greenwich, Conn.

[22] Filed: Jan. 25, 1971

[21] Appl. No.: 109,254

[52] U.S. Cl. .................................. 302/2 R, 302/31
[51] Int. Cl. .............................................. B65g 51/02
[58] Field of Search .................. 104/23 FS; 214/1 BE; 302/2 R, 29, 31

[56] References Cited

UNITED STATES PATENTS

| | | | |
|---|---|---|---|
| 3,405,977 | 10/1968 | Albright | 302/29 |
| 2,848,820 | 8/1958 | Wallin et al. | 214/1 BE |
| 3,437,335 | 4/1969 | Gluskin | 302/29 X |
| 3,210,124 | 10/1965 | Niemi et al. | 302/29 X |
| 2,342,680 | 2/1944 | Melzer | 214/1 BE |
| 3,512,481 | 5/1970 | Hershey | 104/23 FS |
| 3,105,720 | 10/1963 | Barker | 302/2 R |
| 3,129,978 | 4/1964 | Szatkowski | 302/2 R |
| 2,805,898 | 9/1957 | Willis | 214/1 BE |

Primary Examiner—Harvey C. Hornsby
Assistant Examiner—W. Scott Carson
Attorney—Patrick J. Walsh

[57] ABSTRACT

The conveyor includes an elongated channel-shaped trough for receiving circular articles. The trough includes a pair of side members extending in generally spaced parallel planes with openings through the members for transmitting air into the trough. The openings in one of the members are configured to provide air jets into the trough in a direction perpendicular to the one member to displace the articles in the trough toward the other member. The openings through the other member are configured to provide air jets having flow components predominantly parallel to the members to impart a propelling force to the articles. The articles are thus maintained in spaced relation from the one member in the course of their conveyance. Air issues outwardly from the trough along an open side thereof and imparts a force to the circular articles tending to rotate the latter in their direction of movement along the trough.

6 Claims, 8 Drawing Figures

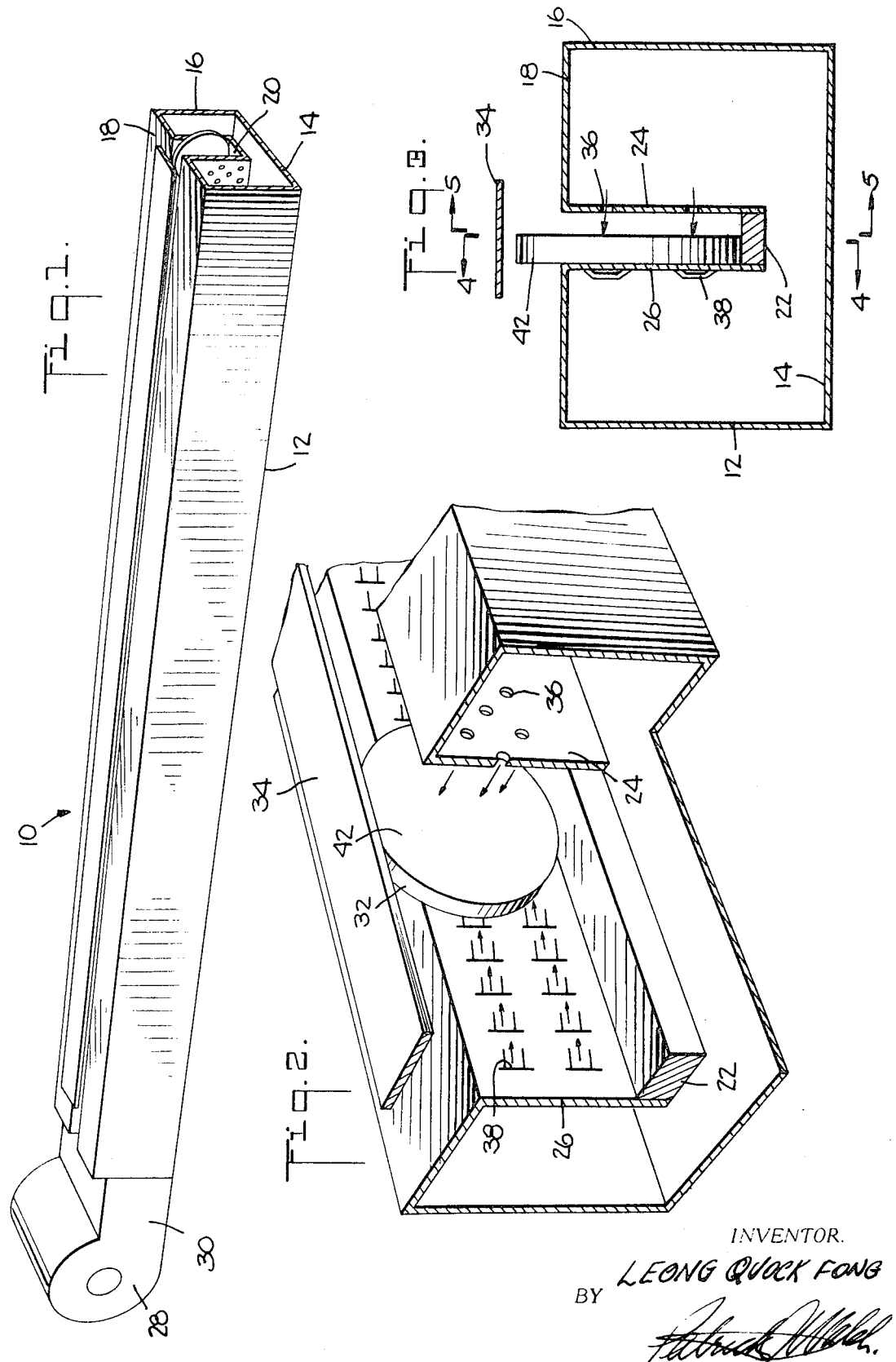

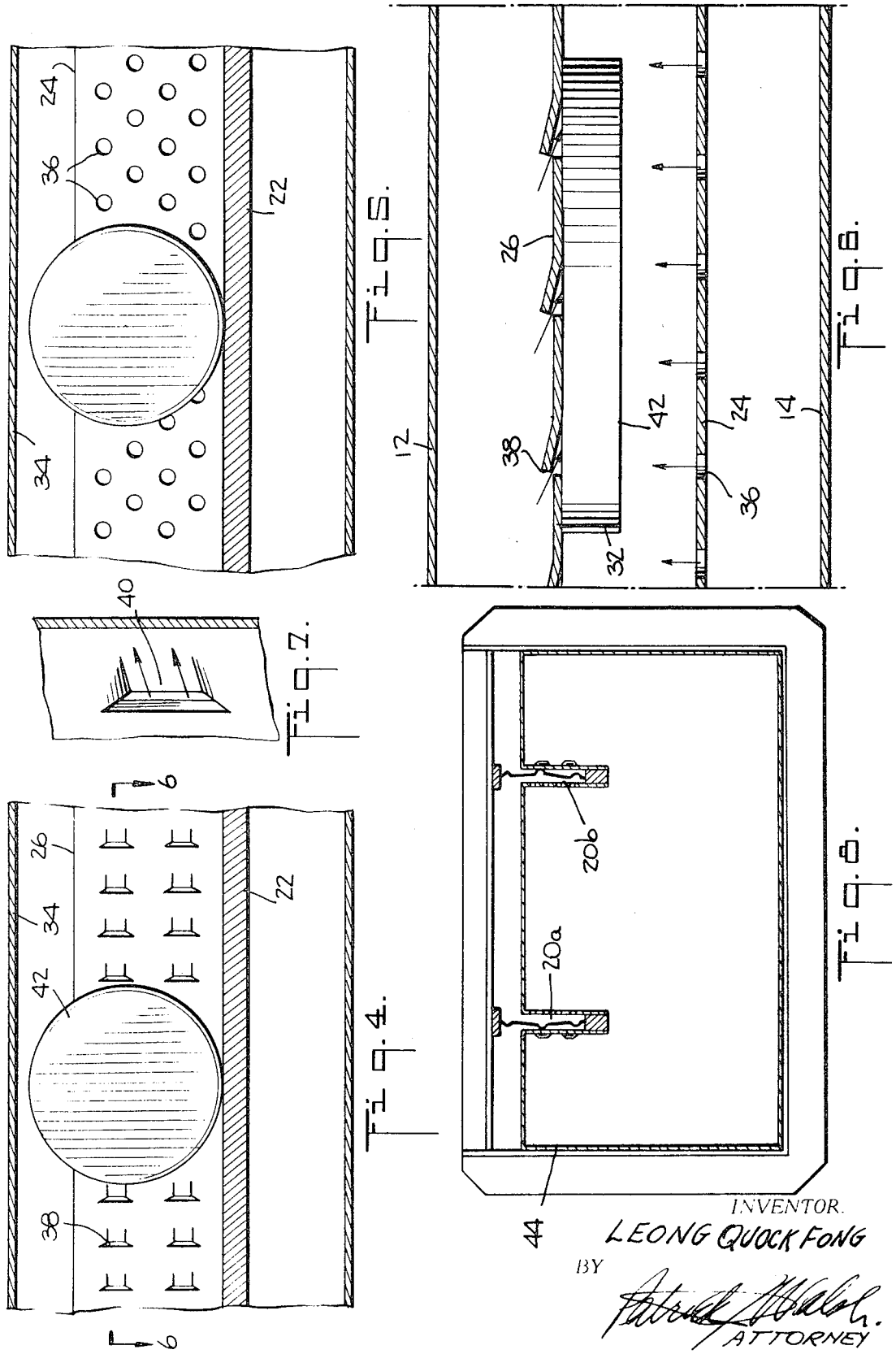

AIR CONVEYOR FOR FLAT THIN ARTICLES

The present invention relates to an air conveyor for moving articles along a predetermined path and particularly relates to an air conveyor specifically configured for moving circular disc-like articles along a predetermined path while maintaining one of the faces of the articles from contact with the conveyor.

Air conveyors, that is those conveyors utilizing air jets issuing through openings formed in one or more conveyor deck surfaces, are known in the prior art. In general, the openings in these known conveyors usually comprise either lift holes or directional slots formed through a conveyor deck. The lift holes are generally configured such that the air issues therefrom in a direction perpendicular to the deck for the purpose of lifting the object conveyed and maintaining it in spaced relation to the deck. The directional slots are configured such that the air issues therefrom in a direction to provide a propelling force to the articles. Combinations of lift and directional openings are normally employed in these conveyors and the articles are maintained in spaced relation from the conveyor throughout their conveyance. It has been found, however, that such arrangements of lift holes and directional slots in lifting type conveyors are not suitable for use in conveying generally flat thin articles as control over the motions of such flat thin articles is difficult to obtain without physical contact between the articles and the conveyor.

Air conveyors are, however, generally desirable for conveying flat thin articles in view of the many advantages intrinsic to air conveyors in general, i.e., the lack of moving conveyor parts, simplicity in operation, etc. Moreover, in many instances, it is particularly desirable to maintain at least one of the flat surfaces of articles out of contact with the conveyor and this makes an air conveyor a particularly attractive solution for conveying flat thin articles under these conditions. For example, it is desirable to convey circular can ends wherein one of the flat surfaces of the cans has been treated with a coating. If the coating is scratched or otherwise penetrated, the can end will discolor and oxidize. It is therefore desirable to convey such can ends in a manner maintaining the coated surface out of contact with the conveyor.

The present invention provides a novel air conveyor useful for conveying flat articles and particularly useful for conveying flat circular of disc-like articles wherein it is desired to maintain one of the flat surfaces out of physical contact with the conveyor. To this end, the present invention provides a conveyor comprising a channel-shaped trough with the opposing side members of the trough having discrete openings therethrough for transmitting air from a plenum into the trough. The openings in one of the side members comprise holes configured to provide air jets into the trough in a direction substantially normal to the side members while the openings in the other side member comprise slots configured to direct air jets having flow components predominantly in the direction of movement of the articles. In this manner, flat articles disposed in the trough and lying in generally parallel relation to the side members of the trough, are maintained in spaced relation from the side member having the normally directed air jets while the slots in the other side member provide air jets for propelling the article along the trough. Thus, the faces of the articles in opposition to the side member of the trough having the openings through which normally directed air jets issue are maintained out of physical contact with the conveyor throughout the conveyance of the articles.

The present invention is particularly effective for air conveying circular articles. To this end, the depth of the conveyor trough is configured in relation to the diameter of the circular articles such that portions of the articles project outwardly from between the side members and through the open side of the channel-shaped trough. A particular advantage of this arrangement resides in the recognition of the fact that the air which escapes from the trough through its open side has flow components which tend to rotate the circular disc-like articles in the direction of conveyance of the articles. Thus, this escaping air is utilized to roll the circular articles on their edges along the conveyor. By so utilizing this escaping air, less plenum pressure is required than would be necessary for conveyance without a rolling action. Moreover, by exposing portions of the articles outwardly beyond the confines of the conveyor, visual observation of the articles being conveyed is obtained.

By the foregoing described conveyor arrangement, articles may be conveyed around turns or bends without stalling and thus a substantially jam-free conveyor is provided. Further, the basic conveyor configuration may be adapted for conveying circular disc-like articles in any direction (horizontally, vertically, inclined, declined or around turns) without any significant change thereto. Moreover, a plurality of channel type conveyors can be readily provided utilizing a single plenum chamber therefor whereby the quantity of articles conveyed can be significantly increased merely by the provision of additional channels.

Accordingly, it is a primary object of the present invention to provide an air conveyor particularly adapted for conveying flat articles.

It is another object of the present invention to provide an air conveyor particularly configured for maintaining at least one surface of the article conveyed out of physical contact with the conveyor.

It is still another object of the present invention to provide an air conveyor particularly adapted for conveying circular disc-like articles.

It is a further object of the present invention to provide an air conveyor for conveying circular disc-like articles wherein the conveyor is specifically configured to utilize air escaping therefrom to impart a rolling action to the articles.

It is a still further object of the present invention to provide an air conveyor for conveying flat articles wherein portions of the articles are exposed to view.

It is a still further object of the present invention to provide an air conveyor particularly for conveying circular disc-like articles wherein the articles can be conveyed in virtually any direction.

These and further objects and advantages of the present invention will become more apparent upon reference to the following specification, appended claims, and drawings wherein:

FIG. 1 is a fragmentary perspective view of a portion of an air conveyor constructed in accordance with the present invention;

FIG. 2 is an enlarged fragmentary perspective view of a portion of the air conveyor illustrated in FIG. 1;

FIG. 3 is a transverse cross sectional view thereof;

FIGS. 4 and 5 are cross sectional views thereof taken generally about on lines 4—4 and 5—5 respectively in FIG. 3;

FIG. 6 is a horizontal cross sectional view of the conveyor illustrated in FIG. 1;

FIG. 7 is a fragmentary perspective view of a directional slot employed with the conveyor hereof; and FIG. 8 is a transverse cross sectional view of another form of conveyor hereof.

Referring now to the drawings, particularly to FIG. 1, there is illustrated an air conveyor generally indicated 10 comprising an elongated enclosure or plenum 12 having bottom and side walls 14 and 16 respectively and a top wall 18 centrally recessed to provide a generally channel-shaped trough generally indicated 20 coextensive with plenum 12. The channel-shaped trough 20, as particularly illustrated in FIG. 2, includes a base guide rail 22 and a pair of side wall members 24 and 26 transversely spaced one from the other. A suitable blower 28 supplies air through a transition duct 30 into plenum 20 at one end thereof and each side wall member has a plurality of openings for transmitting air from plenum 12 into trough 20. The channel-shaped trough 20 is adapted to receive articles such as the circular disc-like articles indicated 32 for movement along the conveyor, the edges of articles 32 bearing on lower guide rail 22. An upper guide rail 34 is suitably secured in spaced relationship above trough 20 and in spaced relation to the edge of articles 32 carried in the trough to constrain the articles 32 from movement out of the trough.

Referring now particularly to FIGS. 2, 4, and 5, each of side walls members 24 and 26 are provided with openings 36 and 38 respectively through which air issues in the form of air jets into trough 20 and impinges against articles 32. In accordance with the present invention, the openings 36 through side wall member 24 are arranged in discrete longitudinally extending staggered rows. The holes 36 in each row are preferably circular and configured to transmit air from plenum 12 such that the air jets issuing from the holes are directed substantially normal to the plane containing member 24. That is to say, the air jets issuing through holes 36 impinge directly against the flat sides of and substantially perpendicular to articles 32 in conveyor trough 20 whereby the air jets displace articles 32 away from side wall member 24. The openings in side wall member 26 are arranged in discrete longitudinally extending rows and comprise directional slots 38. Slots 38 are configured such that air jets issuing therefrom have flow components predominantly parallel to and in the direction of movement of articles 32 along the conveyor. Specifically, directional slots 38 are formed by incising a portion of side wall member 26 at each slot location and depressing an immediately adjacent downstream portion 40 (FIG. 7) of wall member 26 in a direction away from the trough whereby the depressed portion 40 inclines laterally into plenum 12. The depressed portion 40 forms a baffle for directing the air issuing through the slot formed by the edge of the depressed portion 40 and the edge of the adjacent portion of member 26 into trough 20 in a direction substantially paralleling the surface of member 26.

With the foregoing arrangement and configuration of the openings in side wall members 24 and 26 of conveyor trough 20, it will be appreciated that the air jets issuing from plenum 12 through holes 36 tend to displace articles 32 toward the opposite side wall member 26 and do not provide any substantial force component tending to move articles 32 along the conveyor. It will also be appreciated that the air jets issuing through directional slots 38 from plenum 12 impart a force to articles 32 and propel the latter along the conveyor. With this arrangement, articles 32 are conveyed along a path offset from the centerline of the trough toward side wall member 26. Thus, throughout the extent of the conveyance of articles 32 along conveyor 10, the surface 42 of article 32 remains in spaced relation from side wall member 24 and remains out of contact with conveyor 10. This is significant wherein it is desired to prevent physical contact between the conveyor and at least a face of the article conveyed. For example, where can ends are conveyed, their inner surfaces are coated and it is important to prevent any penetration or scratching of that surface. Thus, with a can end oriented in the trough such that its coated surface is coincident with surface 42, it will be appreciated that its coated surface is precluded from physical contact with conveyor 10 as the can end is moved along the conveyor.

It is a further significant feature of the present invention that the conveyor is specifically configured with respect to the articles being conveyed that it imparts a rolling motion to articles 32 whereby significantly less plenum pressure is required than would otherwise be necessary. To obtain this rolling action and also to provide for visual observation of the articles as they are conveyed along conveyor 10, trough 12 is specifically configured to have a depth less than the diameter of the articles 32 being conveyed. In this manner, portions of articles 32 are exposed above the upper wall 18 of the plenum 12 and the articles can thus be observed as they move along the conveyor. Further, the air flowing into trough 12 through holes 36 and directional slots 38 escapes through the open side of the channel-shaped trough 12. This escaping air has flow components in a direction tending to rotate articles 32 for rolling movement in the same direction as they are being conveyed along conveyor 10. Thus, the circular articles 32 also roll on their edges along lower guide rail 22 as they are moved along conveyor 10.

It will be readily appreciated that the width of the conveyor trough is several times greater than the thickness of the article conveyed. Accordingly, bends or turns can be accommodated along the conveyor without stalling or jamming the articles in trough 20. Also, with the foregoing described conveyor configuration, articles 32 may be conveyed in substantially any direction, either vertically or inclinedly.

Referring now to the form hereof illustrated in FIG. 8, there is disclosed an enlarged plenum chamber 44 having a pair of channel-shaped troughs 20a and 20b. Each trough 20a and 20b is configured similarly as trough 20 in the previous embodiment. That is to say a side wall member of each trough has holes therethrough for directing air jets into the trough normal to the side wall member while the opposite side wall member has directional slots for directing air jets having flow components in the direction of movement of the articles for propelling the articles along the trough. Thus, the basic conveyor configuration is readily adaptable for conveying larger quantities of articles as desired.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An apparatus for conveying circular flat, thin articles comprising a plenum chamber having a vertically oriented longitudinally extending channel-shaped recess defined by a pair of confronting side wall members and a guide member, said guide member defining the base of said recess, said guide member for supporting circular flat thin articles for rolling movement through said recess, each of said side wall members having a plurality of openings therethrough for transmitting air from said plenum into said recess, the openings through one of said walls being configured to direct air jets substantially perpendicular to the other of said walls to move said articles on the guide member toward said other wall, the openings through said other wall being configured to direct air jets into said recess having flow components predominantly parallel to said other wall for propelling the articles to roll along said guide member.

2. An apparatus according to claim 1 wherein said recess has a depth less than the height of articles conveyed.

3. An apparatus according to claim 1 which further includes a second guide member spaced outwardly from the open side of said recess for confining articles with said recess.

4. Apparatus according to claim 1 in combination with said articles, said articles being circular, and means providing for air flow outwardly from said recess through its open side and having flow components in directions tending to rotate said articles in the direction of movement thereof.

5. Apparatus according to claim 1 in combination with said articles, said recess having a depth less than the height of said articles whereby portions of said articles project outwardly beyond said recess and are exposed to view as they are moved along said conveying apparatus.

6. Apparatus according to claim 1 including a second channel-shaped recess spaced laterally from said first mentioned recess and substantially coextensive with said plenum for receiving the articles, said second recess being defined in part by a pair of oppositely disposed walls having a plurality of openings therethrough for transmitting air from said plenum into said second recess, the openings through one of the walls of said second recess being configured to direct air jets substantially toward the other wall of said second recess for displacing articles within said second recess toward the other wall thereof, the openings through the other wall of said second recess being configured to direct air jets into said second recess having flow components predominantly parallel to the other wall of said second recess for propelling the articles along said second recess.

* * * * *